United States Patent [19]
Eden

[11] Patent Number: 5,097,355
[45] Date of Patent: Mar. 17, 1992

[54] SCANNING DEVICE

[76] Inventor: Benjamin Eden, Finland 28 St., Haifa, Israel

[21] Appl. No.: 384,790

[22] Filed: Jul. 25, 1989

[30] Foreign Application Priority Data

Jul. 28, 1988 [IL] Israel .................................... 87252

[51] Int. Cl.[5] ............................................. G02B 26/08
[52] U.S. Cl. .................................... 359/213; 359/199
[58] Field of Search .................. 350/6.6, 6.8, 6.9, 6.5, 350/486, 487

[56] References Cited

U.S. PATENT DOCUMENTS

| 4,502,752 | 3/1985 | Montagy | 350/6.6 |
| 4,874,215 | 10/1989 | Montager | 350/6.6 |
| 4,902,083 | 2/1990 | Wells | 350/486 |
| 4,958,894 | 9/1990 | Khowles | 350/486 |
| 4,974,918 | 12/1990 | Delache et al. | 350/486 |

Primary Examiner—Bruce Y. Arnold
Assistant Examiner—James Phan
Attorney, Agent, or Firm—Fleit, Jacobson, Cohn, Price, Holman & Stern

[57] ABSTRACT

The invention relates to a device for carrying out a repetitive scan of a sensor element according to predetermined parameters. The sensor element is attached to a permanent magnet with diametrically opposed poles resulting in an open magnetic circuit. A coil is provided around said magnet, through which a current is passed, of predetermined frequency and intensity, where means are provided for enabling the rotation of the magnet and the sensor attached thereto as a result of the interaction of the two magnetic fields. According to a preferred embodiment, the scan is controlled by signals originating from electrooptical sensing means arranged in closed loop with the current which is applied to the coil.

13 Claims, 2 Drawing Sheets

SCANNING DEVICE

FIELD OF THE INVENTION

The invention relates to means for applying a scanning or a vibratory motion, at a predetermined amplitude and frequency, to a scanning element.

The device of the invention is based on the interaction of a permanent magnet, the poles of which are on each side of the axis of rotation of the scanning element, which element is firmly attached to said magnet, and the magnetic field due to an electric current flowing in a wire coil surrounding said magnet, with a small radial clearance between the magnet and the coil. Restoring the magnet to its initial position or reversal of the scanning motion is achieved by reversing the current through the coil. The magnet and scanning element attached to it move in a suitable mechanical arrangement via flex-pivots or bearings.

The compact device is based on an open magnetic circuit of the permanent magnet and its interaction with a perpendicular magnetic field due to current in the coil; the resulting force F on the movable magnet and element attached thereto being perpendicular to the said permanent magnet field B and current I.

It is thus possible to construct a thin "pancake like" structure of small dimensions, compact nature and comparatively inexpensive nature.

BACKGROUND OF THE INVENTION

Hitherto mechanical scanning devices were of rather large size, generally based on a servo-motor assembly. Such scanners are of use in the field of microwaves, in laser technology, in certain medical devices etc., where there can be used a variety of scanning elements. Conventional devices frequently comprise an electrical motor mounted on the axis of rotation, in combination with a variety of control elements. Conventional devices are rather large, have a substantial weight and inertia and are rather impractical for uses where miniaturization is a necessity. Conventional devices also comprise mirrored polygons or prisms which are rotated by a motor at a high rate of rotation.

The present invention overcomes to a large extent drawbacks of known devices and provides a simple, light-weight, small-size device which provides for a predetermined scanning or vibrational motion of the scanning element.

SUMMARY OF THE INVENTION

The invention relates to a scanning device for carrying out a sweeping motion of a scanning element within a limited predetermined angle, generally in the range of $+/-20°$, at a predetermined frequency. The novel device is of small size, compact structure and can be produced from inexpensive components. The device is based on the interaction of an open magnetic circuit of a permanent strong magnet and the magnetic field, perpendicular to the first one, due to an electric current flowing through a coil surrounding said magnet, at a small clearance from same permitting rotation of said magnet with a scanning element which is rigidly attached to said magnet. The novel device is characterised by its simplicity, symmetry, low weight and volume, low power consumption and rather inexpensive nature. According to one embodiment there is used a strong permanent ring-shaped magnet, to which there is attached a sensing element, such as a mirror.

The device comprises a frame to which there is attached via a flexible element (such as flex pivot), or via conventional bearings, an element comprising in combination such ring-shaped magnet with attached sensing element (mirror), said magnet being surrounded by a wire coil, means being provided for energizing said coil in a predetermined manner. The permanent magnet is magnetized diametrically so that the magnet poles are opposite each other in the plane of the ring, the direction of the magnetic field being perpendicular to the axis of rotation of the magnet. There exists only a small radial clearance between the outer diameter of the ring-shaped magnet and the inner diameter of the coil. When current flows through the coil, the resulting magnetic field interacts with the magnetic field of the permanent magnet which is perpendicular thereto, resulting in a moment in a direction perpendicular to those of said magnet fields, according to the basic equation of $F = i \times B$ where B is the Vector of the magnet field, i is the vector of the current in the coil and F is the resulting force vector perpendicular to the two other vectors. The resulting rotational motion is controlled by conventional control means which control the parameters of the sweep or of the vibration. The frequency of the current and the mechanical elements define the angle and waveform of the sweep which will be within an angle of $+/-20°$ and preferably between about $+/-2°$ to about $+/-7.5°$.

It is preferred to use flexible constraining elements such as flex pivots. There can also be used small conventional bearings. There are advantageously used strong permanent magnets of the samariumcobalt type, which are magnetized so as to establish two diametrically opposite magnet poles. The open magnetic circuit is the basis of the novel device. Generally there will be used ring shaped magnets of about 10 to 100 mm diameter and of from about 2 to 10 mm thickness. There can also be used other configurations of magnets, such as magnet rods or bars, with magnetic poles at their ends. The wire coil surrounding the magnet defines a gap of the order of 0.2 to 0.3 mm which allows adequate clearance for the mechanical movement, yet is close enough for a very strong interaction of the magnetic fields. The voltage of the current passed through the coil will be generally in the 5 V range and a power of about 0.3 W to about 1 W will be generally adequate for the desired sweep.

The sensing element, attached to the permanent magnet, can be a mirror, a small antenna etc. The invention is illustrated with reference to a small mirror, but this is by way of example only. As already mentioned, the magnet is not necessarily a magnet of ring shape. It may be a polygon; it may be a rod-shaped magnet magnetized along its axis, the main requirement being the provision of two magnet poles at opposite locations with open magnetic circuit. In all configurations the magnet flux lines emanate from the poles, the magnetic field being perpendicular to the direction of rotation (axis of rotation).

The sweep-system of the invention can be used with microwave apparatus and with telecommunication equipment where a sweep within a small angle is required. Suitable detection means will be attached to the movable mirror.

Furthermore, the suspension of the magnet and element attached to it (mirror, etc.) may be in a gimbal or similar system, with means for returning the magnet to its initial position at the end of the sweep.

There is further advantageously provided a control system for the positive control of the sweep motion. A preferred embodiment of such control system comprises electro-optical position sensing means in a closed loop with the current applied to the coil. Such system can comprise a LED facing a detector, with a "flag" interposed between them. The Flag is connected to the vibrating mirror.

The rotor is balanced about its axis of rotation by a suitable choice of the magnet which serves also as a balancing weight.

The parameters of the sweep will be of a predetermined nature: The sweep can be at a uniform rate in one direction with a rapid return and repetition of the sweep. It can be at an identical sweep velocity in both directions. The motion is a predetermined one, both as regards the frequency of the movement and as regards its wave-form. A preferred element is a mirror directly attached to the magnet ("the rotor"). Various mirror types, such as plane concave, convex, spherical or aspherical etc., can be used. The mirror element will be used in order to convey electromagnetic radiation to suitable sensing elements, resulting in a picture of the scanned object. The resulting frequency is a result of the frequency of the applied current. It is possible to vibrate the mirror in resonance which depends on the mechanical element (mass of the rotating element) and of the flex-pivots; generally it is advantageous to apply a current of a frequency which is close to, but not identical with that of the mechanical elements.

It is advantageous to resort to a small radial clearance (of the order of about 2/10 to 3/10 mm) between the outer diameter of the magnet ring and the surrounding coil or between magnet bar pole and coil. This results in a very strong interaction of the magnet fields and the magnet field of the surrounding coil, resulting in a maximum moment.

The simple and low-weight device eliminates the necessity to use a servo-motor which applies its force to the axis of rotation. The novel device has the further advantage that it takes up very little space, has a low consumption, is of flexible design, and that it makes possible a flat, compact "pancake-type" structure. The open magnetic circuit motor is concentric and flat around the moving mirror.

DETAILED DESCRIPTION OF PREFERRED EMBODIMENTS

Figure 1:
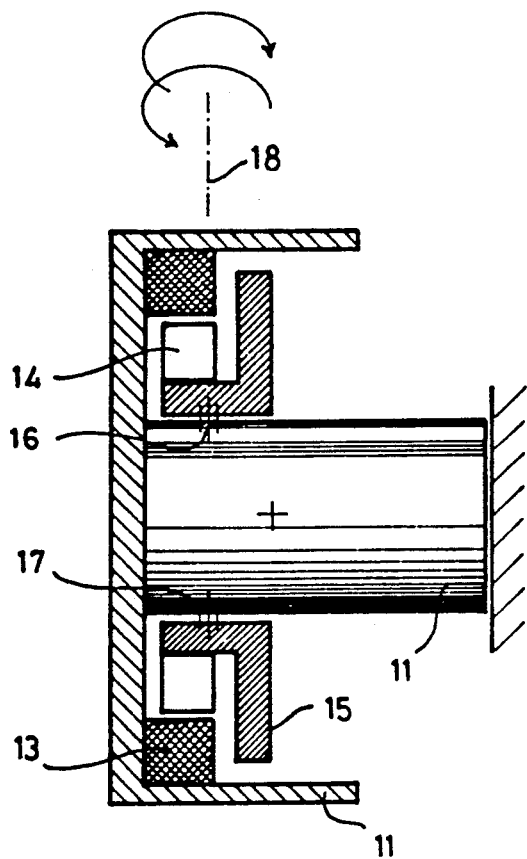
FIG. 1 is a cross-sectional view of a device of the invention with external scanning axis.

As shown in FIG. 1, a device of the invention comprises a ring-shaped frame 11 to which there is firmly attached a circular wire coil 12 which is provided with leads for attachment to a suitable power source, not shown in the Figures. There is provided a strong permanent ring-shaped magnet 13 which is attached to support member 14, which supports a firmly attached mirror 15. The support member 14 is attached to the frame 11, via flex pivots 16 and 17, and thus the integral structure of magnet 13, support 14 and mirror 15 are able to move about the axis of rotation 18. When the coil 12 is energized for a brief period of time, the assembly 13/14/15 will rotate for a predetermined angle, generally of the order of up to about 15°, and preferably within the range of about 2° to about 10°. The mirror will thus scan a certain section where the duration and angle of scan depend on the frequency of the current through coil 12.

Figure 2:
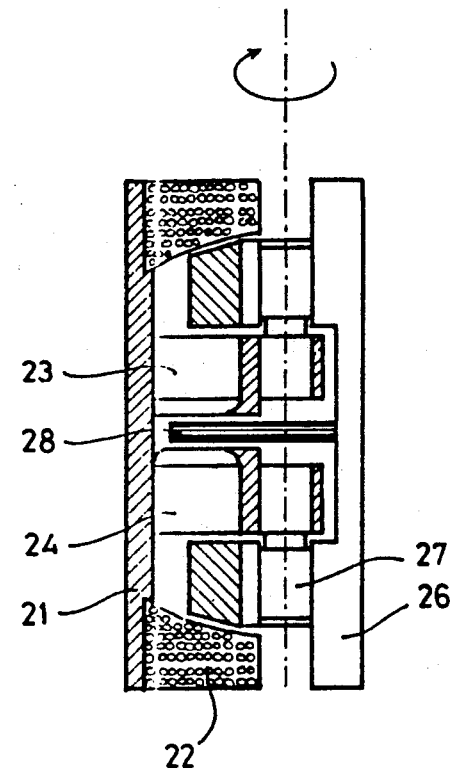
FIG. 2 is a cross-sectional view of a device of the invention with internal scanning axis.
Figure 3:
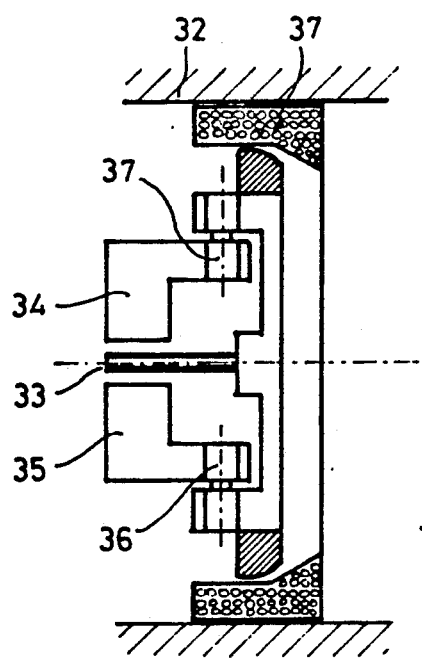
FIG. 3 is a cross-sectional side-view of a device of the invention with wide angle scanning option.

Another embodiment of the invention is illustrated with reference to FIG. 2 where 21 is support member to which there is firmly attached the circular wire coil 22. The support member 21 supports also the LED 23 and photodetector 24. There is provided a strong permanent magnet 25 which forms an entity with mirror 26, which entity is able to effect a scanning motion about the axis indicated by the arrow about flex pivots 27. To said mirror 26 there is attached a "flag" 28 which passes during the sweep between the LED and the detector, and which permits an accurate control of the scan by a control of the current to the coil. This device has an internal scanning axis. A similar device is shown in FIG. 3, which provides for a wide-angle scanning option. Coil 37 is attached to support 32.

A flag 33 is attached to the mirror and passes between LED 34 and detector 35 which are supported by the same support via flex joints 36 and 37, so as to be able to effect the scanning motion about the axis indicated by the arrow.

Figure 4:
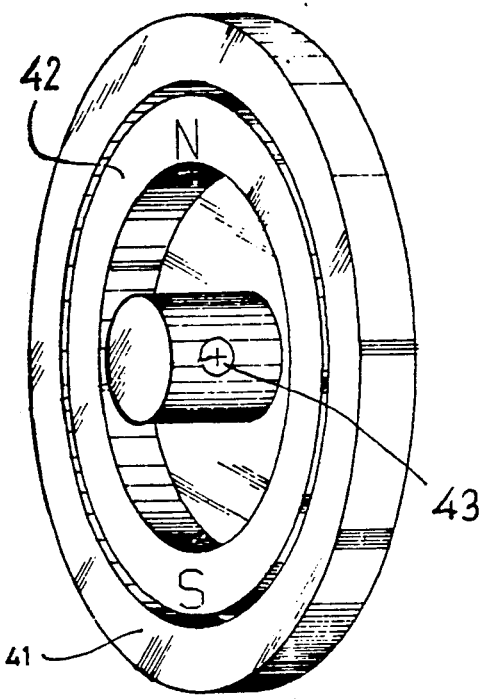
FIG. 4 is a perspective view of a device of the invention with horizontal axis of rotation.

As shown in FIG. 4, there is provided a coil ("stator") 41, with coaxial magnet ring 42, with small radial clearance, to which there is rigidly attached a mirror. The magnet poles are indicated as S and N, and the vector of the resulting magnetic field as B. The electric current I (FIG. 5) flowing through coil 41 (arrow) results in a magnetic field perpendicular to the first one, the interaction of these producing a force (vector F) (according to $F = I \times B$) which tends to rotate the magnet ring about its axis of rotation 43. Changing the direction of I will change the direction of F causing a counter rotation of the mirror attached to the magnet ring.

Figure 6:
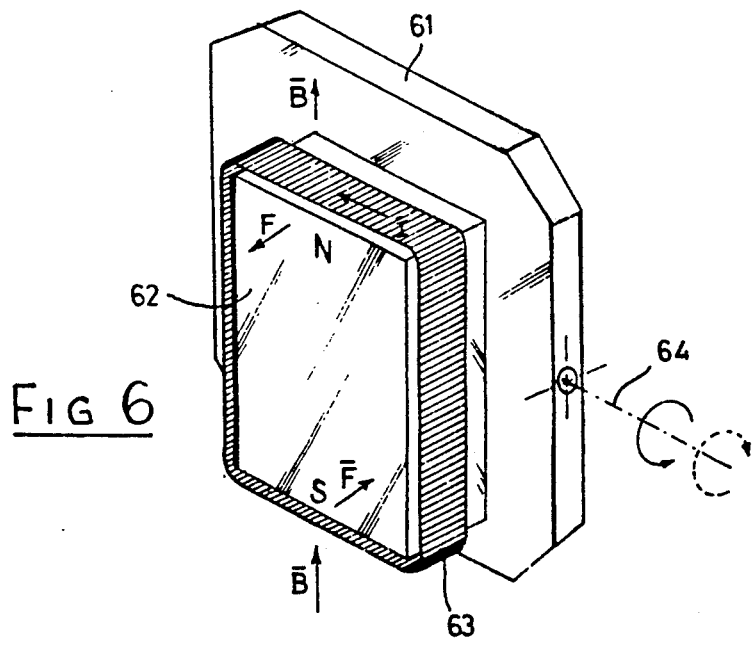
FIG. 6 illustrates another embodiment with a bar-shaped magnet.

As shown in FIG. 6, a device of the invention comprises a mirror 61 firmly attached to permanent magnet bar 62, with poles S and N at its ends, said magnet bar 62 being surrounded by a coil of rectangular cross-section 63 which is attached to a current source. The magnetic field B interacts with the magnetic field of the coil caused by 63, I, in such a manner so as to result in a vector F, perpendicular to the magnetic field and vector I which tends to rotate the magnet-mirror about the axis of rotation 64.

Figure 5:
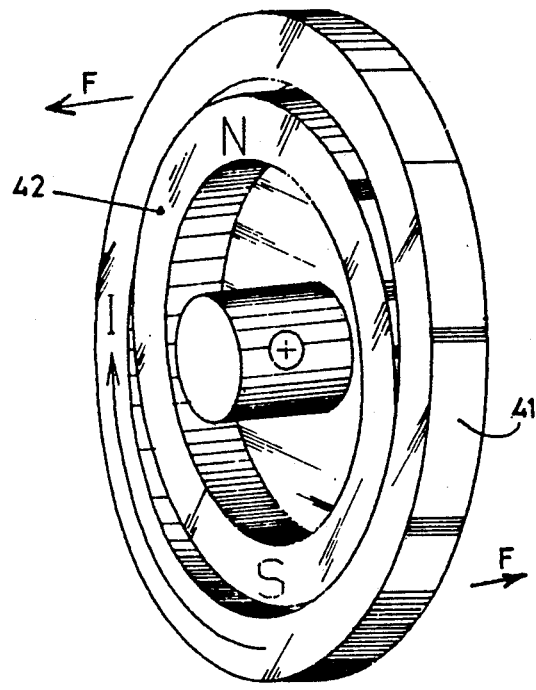
FIG. 5 is a view of the device of FIG. 4 wherein the permanent magnet ("rotor") is displaced from the plant of the coil.

FIG. 5 illustrates a displacement of the magnet ring 42 from the plane of coil 41, as a result of such interaction. The rotation takes place while the mirror-magnet unit is able to do so about flex-axis members or about bearings (ball bearings) which are attached to the frame which supports the coil.

I claim:

1. A device for carrying out a repetitive bidirectional scan or vibration at a predetermined frequency and with a predetermined angle of sweep, said device comprising a subunit of a diametrically magnetized permanent ring-shaped magnet having a cross-section of small size with respect to the diameter of the magnet and two magnetic poles wherein the two magnetic poles are the exterior surface of the ring-shaped magnet and a sensing element attached thereto, and another subunit of a frame to which there is attached a wire coil concentric with said magnet, having a small gap between the magnet and wire coil, means being provided for passing a current through the coil so that the magnet-sensor ("rotor") will be able to rotate in a statically balanced manner about an axis of rotation when the open magnetic field of the permanent magnet and that due to the current in the coil, which are always perpendicular with each other, interact to produce a force vector and a moment about the axis of rotation, the magnetic field of the coil being reversible.

2. A device according to claim 1, provided with control means for controlling the frequency and angle of the sweep or vibration.

3. A device according to claim 1, where the magnet is ring-shaped and the coil is a circular coaxial one inside or outside the magnet, with a small radial clearance between them.

4. A device according to claim 1, where the permanent magnet is of the samarium-cobalt type.

5. A device according to claim 1, where the magnet is magnetized to define diametrically opposite poles, resulting in an open magnetic circuit, the magnetic force lines in the device being essentially perpendicular to the current vector i in the coil and perpendicular to the axis of rotation.

6. A device according to claim 1, where the rotatable unit is connected to the frame via flex pivots or via bearings.

7. A device according to claim 1, where the sensor attached to the rotatable magnet is a mirror, an antenna or other sensor.

8. A device according to claim 7, where the mirror is an annular one of plane, spherical or aspheric configuration.

9. A device according to claim 1, comprising electro-optical sensing means in a closed loop with the current applied to the coil.

10. A device according to claim 1, where there is used a rod-shaped or bar shaped permanent magnet with diametrically opposite magnet poles, with a coil of corresponding shape surrounding said magnet, with a gap enabling the required rotation within a given angle.

11. A device according to claim 1 with a ring-shaped magnet of a diameter of from 10 to 100 mm and of 2 to 10 mm thickness, or a rod-shaped magnet of a length of from 10 to 100 mm.

12. A method for imparting to a sensor element a sweep motion of predetermined parameters, which comprises the steps of attaching said sensor to a permanent magnet with diametrically opposite poles resulting in an open magnetic circuit, providing a coil around said magnet and passing through the coil a current of predetermined frequency and amperage wherein an magnetic field produced in the open-circuit permanent magnet is always perpendicular with that due to the current passing through the coil; rotating said magnet and sensor attached thereto in a statically balanced manner as a result of the interaction of said magnetic fields producing a force vector and moment about an axis of rotation.

13. A method according to claim 12 where the parameters of the scan or vibration are controlled by signals obtained from electro-optical sensing means which are in closed loop with the current applied to the coil.

* * * * *